Aug. 20, 1940.  R. G. GLOVER  2,212,059
TIRE TOOL
Filed Feb. 21, 1939
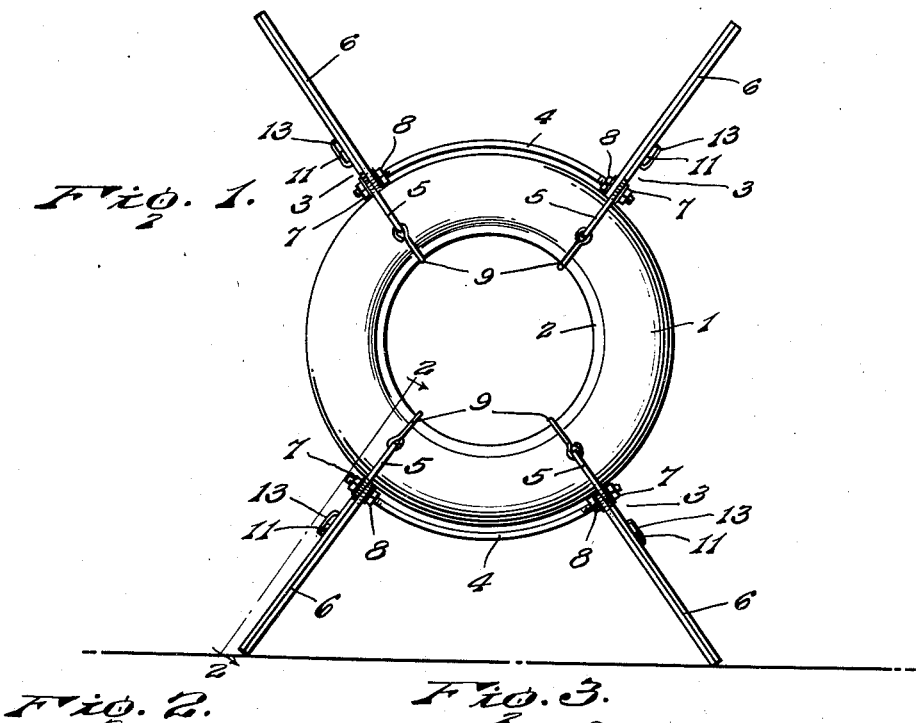
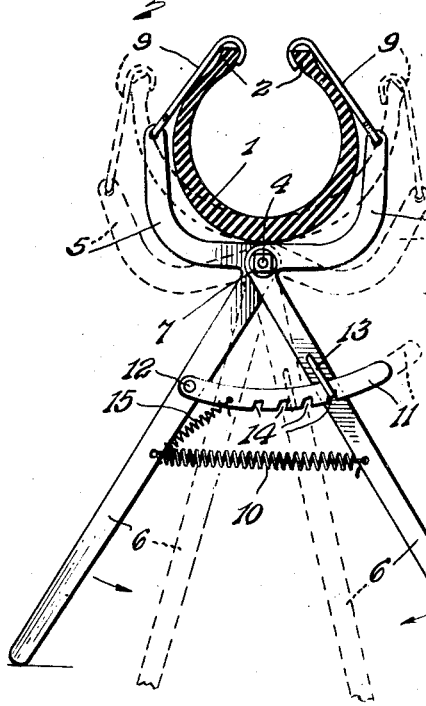
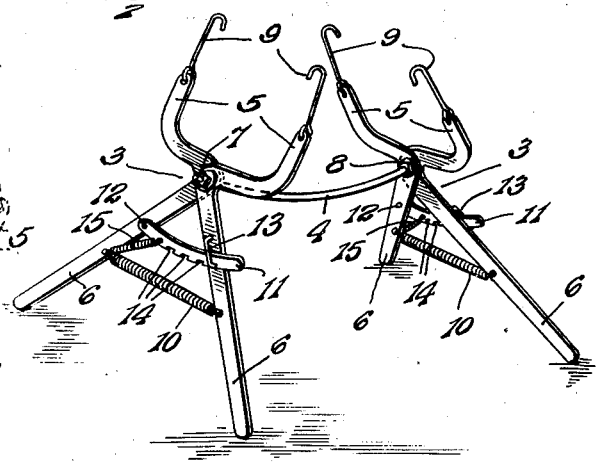
Inventor
R. G. Glover.
By Ross J. Woodward,
Attorney Patented Aug. 20, 1940

2,212,059

UNITED STATES PATENT OFFICE 2,212,059

TIRE TOOL

Ruel G. Glover, Cromwell, Okla.

Application February 21, 1939, Serial No. 257,710

2 Claims. (Cl. 154—9)

This invention relates to a tire tool and it is one object of the invention to provide a tool by means of which a tire may be very easily spread during insertion or removal of an inner tube.

Another object of the invention is to provide a tire tool consisting of pairs of companion tools so mounted and arranged that jaws of the tools engage a tire casing in spaced relation to each other circumferentially thereof, thus permitting marginal portions of the tire to be gripped at a plurality of points and the tire very effectively spread for insertion or removal of the tube.

Another object of the invention is to so mount pairs of companion tools that they may serve as a support for the tire as well as serve as means for spreading the tire and holding it in a spread condition.

Another object of the invention is to provide a device of this character wherein the companion tools include jaws and handles pivotally mounted by a rod or bar serving not only as a pivot but also as a strut extending between the pair of tools and cooperating therewith to form the tire supporting frame.

The invention is illustrated in the accompanying drawing wherein:

Fig. 1 is a side elevation showing tools of the improved construction applied to a tire.

Fig. 2 is a view taken along the line 2—2 of Fig. 1.

Fig. 3 is a perspective view showing the improved tire tool in position to support and spread a tire.

This improved tire tool constitutes means for spreading the walls of a tire casing and also means for supporting the tire in an upright position so that after it has been spread, a tube may be very easily removed therefrom or inserted into the tire casing.

The tire or casing 1 is of a conventional construction and has its walls formed with the usual heels or beads 2 for engaging the flanges of a rim and holding the tire in place about the rim. When such tire is placed flat on the ground, a person must assume a crouching position while spreading the tire and removing or inserting the tube. This is tedious work, whereas, if the tire is supported upright and spread, the tube may be very easily inserted or removed.

In order to support and spread the tire, there have been provided a pair of tools 3 connected by a rod 4 which maintains the tools in spaced relation to each other and is curved longitudinally, as shown in Fig. 1, so that it will conform to the curvature of the tread portion of the tire 1. A duplicate set of tools is disposed over the tire so that, in addition to supporting the tire in an upright position and spreading its lower portion, the upper portion of the tire may also be spread and a tube very easily removed or inserted. Each of the tools 3 consists of companion members formed of strong metal, said members being shaped to provide L-shaped jaws 5 and handles or levers 6 extending from inner ends of the jaws diagonally thereof in diverging relation to each other. The companion members are overlapped at the junction of their jaws and handles and these overlapping portions are formed with openings to receive ends of the rod or strut 4. After ends of the rod have been passed through the openings, nuts 7 are applied and since the threaded end portions of the rod also carry nuts 8, the companion members will be held in their proper positions upon the rod and mounted for pivotal movement.

Hooks 9 are loosely carried by the jaws at their free outer ends for engaging the heels of a tire, as shown in Fig. 2, and from an inspection of this figure it will be seen that when the handles 6 of the companion members are swung toward each other, the jaws 5 will be swung away from each other and the tire casing spread from the normal position shown in full lines in this figure, to the spread position indicated by dotted lines. The levers or handles are urged toward each other by a helical spring 10 and, in order to hold the levers in adjusted relation to each other, there has been provided a latch bar 11 pivoted to one lever, as shown at 12, and extending between the levers transversely thereof with its free end portion engaged through the loop or keeper 13 carried by the other lever. Notches 14 to receive the keeper, are formed in the latch bar in spaced relation to each other longitudinally thereof and, in order to yieldably hold the latch bar in position for engagement of the keeper in the notches, there has been provided a spring 15 secured at its ends to the latch bar and one lever and exerting pull upon the latch bar.

When the improved set of tools is in use it is placed upon the ground and a tire set in place between the jaws of the pair of tools. Pressure may then be applied to the lower portion of the tire or pull exerted upon the handles to spread the handles and cause the jaws to be swung toward each other until the hooks 9 may be engaged with the heels 2 of the tire. In view of the fact that the latch bars are curved longitudinally and the notches cut diagonally, the levers may be shifted away from each other, but since the latch bars are engaged by the springs 15, the keepers will be caused to engage in the notches and secure the levers in set positions of adjustment. After the hooks have been engaged with the heels of the tire, the latch bars will be shifted to a releasing position and the levers swung toward each other, thus causing the jaws to be swung apart and pull exerted to spread the tire casing, as indicated by dotted lines in Fig. 2. It will thus be seen that the implement will serve as means for spreading the tire and also as means for supporting it in an upright position so that a workman may very easily remove a tube or insert a tube without leaning over or assuming a crouching position.

The second implement or pair of tools is disposed over the tire and operated in the same manner as the lower set, to engage and spread the upper portion of the tire. As the hooks are spaced from each other substantially equal distances about the circumference of the tire, pull exerted by the hooks and the jaws will cause the tire to be spread for its entire circumference. When the tire casing is to be released and allowed to return to its normal condition, it is merely necessary to shift the levers or handles away from each other and the jaws and hooks will move to a position in which the hooks can be released from the heels of the tire. In view of the fact that the implements disposed above and below the tire are of duplicate construction, either may be used as a support for the tire and the other disposed over the tire.

Having thus described the invention, what is claimed is:

1. An implement of the character described comprising a pair of tools each including companion jaws and actuating handles for the jaws, a bridge extending between said tools and having end portions passing through companion jaws to pivotally mount the same, a spring extending between and secured to companion handles for urging the handles in a direction for moving the jaws toward each other, a latch bar carried by one of the companion handles, a keeper carried by the other companion handle, said latch bar being formed with recesses for receiving the keeper to releasably maintain the handles in a set position of adjustment, and a spring for yieldably holding the latch bar in position for engaging the keeper in a recess of the latch bar.

2. An implement of the character described comprising a bridge curved longitudinally to follow the curvature of the tread of the tire, jaws pivotally mounted at ends of said bridge for straddling a tire and engaging heels of walls of the tire, actuating handles for said jaws constituting ground-engaging supporting legs for the implement and together with the bridge forming a self supporting implement, and means for releasably holding said handles in a set position of adjustment, said implement being adapted to be disposed under a tire with the handles resting upon the ground to support the implement and the tire in an upright position with the jaws in engagement with heels of the tire from opposite sides thereof, and a second implement for disposition over the tire having a longitudinally curved bridge, jaws at ends of the bridge for straddling the tire and engaging heels thereof, and actuating handles for the jaws.

RUEL G. GLOVER.